United States Patent [19]

Lundquist

[11] Patent Number: 5,149,424
[45] Date of Patent: Sep. 22, 1992

[54] CENTRIFUGE APPARATUS FOR RESIDUAL LIQUID WASTE REMOVAL FROM RECYCLABLE CONTAINER MATERIAL

[76] Inventor: Lynn C. Lundquist, 10833 NE. Russell, Portland, Oreg. 97220

[21] Appl. No.: 677,307

[22] Filed: Mar. 29, 1991

[51] Int. Cl.⁵ .............................................. B01D 33/06
[52] U.S. Cl. .................................. 210/174; 210/210; 210/365; 210/376; 210/377; 134/104.2; 134/153
[58] Field of Search ..................... 210/304, 305, 360.2, 210/365, 374, 379, 382, 409, 411, 173, 174, 376, 377, 210; 134/104.2, 153

[56] References Cited

U.S. PATENT DOCUMENTS

| | | | |
|---|---|---|---|
| 636,016 | 10/1899 | Welch | 210/174 |
| 1,478,660 | 12/1923 | Barnes et al. | 210/374 |
| 2,858,942 | 11/1958 | Wenzelberger | 210/374 |
| 2,878,943 | 3/1959 | Ziherl | 210/374 |
| 3,311,240 | 3/1967 | Hirsch | 210/377 |
| 3,361,264 | 1/1968 | Quetsch | 210/377 |
| 3,366,318 | 1/1968 | Steimel | 233/5 |
| 3,570,135 | 3/1971 | Rousselet | 210/376 |
| 3,882,025 | 5/1975 | Talley, Jr. | 210/304 |
| 4,122,014 | 10/1978 | Weininger et al. | 210/377 |
| 4,137,176 | 1/1979 | Dudley et al. | 210/375 |
| 4,186,096 | 1/1980 | Areaux et al. | 210/377 |
| 4,253,960 | 3/1981 | Dudley et al. | 210/373 |
| 4,894,171 | 1/1990 | Nichols | 210/379 |
| 4,925,576 | 5/1990 | Gotlieb et al. | 210/374 |

Primary Examiner—Robert A. Dawson
Assistant Examiner—Matthew O. Savage

[57] ABSTRACT

The present invention is a centrifuge device which separates chips or shreds of containers from whatever liquid residue remains within the containers. The device is suitable for many applications, including the separation of the recyclable plastic of a motor oil container from the remaining re-usable motor oil within the container after the container has ostensibly been emptied. The device may be utilized as a compact, free-standing size reduction and reclaiming device at the location where the container is used, such as in automotive service stations, and the like, or production units may be used in plastic reclaiming plants where large quantities of a given plastic container are being centrally processed.

13 Claims, 1 Drawing Sheet

CENTRIFUGE APPARATUS FOR RESIDUAL LIQUID WASTE REMOVAL FROM RECYCLABLE CONTAINER MATERIAL

BACKGROUND

1. Field of the Invention

This invention provides a means for centrifugally separating residual oil or other liquid contamination from shredded or granulated containers used to package said oil or other liquid. In principle, the apparatus consists of a shredder or cutter assembly at the in-feed area which reduces the container to chips or shreds. The chips or shreds are then fed into a centrifugal device which separates the oil (or other liquid) from the container material. The separated liquid is subsequently drained through a series of filters into a holding tank, while the chipped or shredded container material is discharged into a holding vessel.

With an understanding of the present need to protect both our natural environment and to optimize the use of natural resources, the importance of this apparatus should be readily apparent. In a first case, a mechanical separation of the residual liquid (most notably, motor oil) from its chipped or shredded container assures less pollutants introduced into the waste stream from cleaning operations in the form of an emulsion of water, detergents, and the specific material in the container. In a second case, a mechanical separation assures a greater return of product into its highest value usage with the least energy expended; that is, motor oil may be recovered in the form of pure motor oil rather than as an emulsion which requires expensive reprocessing for commercial reuse.

2. Description of the Prior Art

The technology of centrifugally separating residual liquid which was packaged within a container from the material proper of said container subsequent to shredding or comminution of the container has not heretofore been addressed in any patent available at the time of this application. This is particularly true of plastic containers in the form of blow molded bottles which have contained motor oils or similar non-water soluble liquids.

A new body of technology is growing for the purpose of reclaiming such plastic and other container materials. In most cases, however, the technology has used mechanical agitation in conjunction with washing and soaking bathes to remove said contaminant from the chipped or shredded container.

Centrifugal separation of a residual liquid contaminant of a container, and the shredded material proper from said container, is a novel innovation as suggested in this invention.

However, note must be taken of an older technology which uses centrifugal mechanical separation of cutting fluids and oils from metal chips, borings, and the like as encountered in machine shop operations. In this regard, the patents of Dudley et al. (U.S. Pat. Nos. 4,137,176 and 4,253,960), Areaux et al. (U.S. Pat. No 4,186,096), Weininger et al. (U.S. Pat. No. 4,122,014), Steimel (U.S. Pat. No. 3,366,318), and Ziherl (U.S. Pat. No. 2,878,943) deserve attention. (Note that the two patents of Dudley and the patent of Areaux are refinements of the same practice.)

In reviewing the prior art, it is apparent that Dudley and Areaux (U.S. Pat. Nos. 4,137,176, 4,253,960, and 4,186,096) have devised a technology which is continuous. Furthermore, the above mentioned art loads the material at the bottom of the rotating sieve, and discharges it at the top. Whereas the present invention uses a batch process where the material is held within the rotating sieve throughout a single process run. The present invention further loads the material from the top of the rotating sieve and discharges it from the bottom with the aid of a dumping mechanism. Ziherl (U.S. Pat. No. 2,878,943) is similar to Dudley and Areaux in that his process is continuous and the liquid discharge is at the top. However, Ziherl discharges the solid material at the bottom. Nonetheless, as regards the present invention, the differences between Ziherl and Dudley and Areaux are inconsequential. Refer to the arguments above as to the differences between the present invention and Dudley and Areaux as being similar to the differences between the present invention and Ziherl.

Weininger et al. (U.S. Pat. No. 4,122,014) must be reviewed because of certain apparent similarities with the present invention. Weininger is both a batch process, and feeds the material into the top, and discharges from the bottom, of the rotating sieve. However, as can readily be seen, Weininger primarily teaches the use of a moving distributing plate which in no way anticipates the unique claims of this invention. Nor, does Weininger anticipate the bottom dumping mechanism as developed in this invention.

OBJECTIVES OF THE INVENTION

This invention was developed with an understanding of the limitations of the present methodology used to dispose of, or reclaim containers with residual liquid waste (most notably plastic oil filled containers). Furthermore, it was designed with a number of other objectives considering its potential application.

1. It is the general objective of this invention to provide a means of mechanically separating residual liquid waste (motor oil) contamination from a chipped or shredded, plastic container.
2. Another objective of this invention is to remove said residual liquid waste (motor oil) without creating an emulsion by the addition of water or other chemicals.
3. Another objective of this invention is to salvage said residual liquid waste (motor oil) in a usable form for further use without significant product down-grading.
4. Another objective of this invention is to separate the residual liquid waste (motor oil) or other contaminant from the plastic product without introducing that contaminant into the waste water stream.
5. Another objective of this invention is to provide a compact and efficient unit which could be used in an automotive service station or the like.
6. Another objective of this invention is to provide an embodiment of the invention which may be used on a larger scale in a plastic reprocessing plant to separate residual liquid waste (motor oil or other liquid contaminants) from the plastic to be reprocessed.
7. A final objective of this invention is to utilize the technology of two previous patent applications to this oil separation methodology. That is, the application entitled CUTTER ENHANCEMENT FOR PLASTIC SIZE REDUCTION EQUIP- MENT, Ser. No. 07/595,258, now U.S. Pat. No. 5,110,060, and the application entitled SECONDARY CUTTER APPARATUS FOR PLASTIC SIZE REDUCTION EQUIPMENT, Ser. No. 07/667677, still pending.

These and other objectives and advantages of the present invention, and the manner in which they are achieved, will become apparent in the following specifications and claims.

SUMMARY OF THE INVENTION

In its preferred embodiment, the present invention is a centrifuge device for the purpose of separating chips or shreds of containers from whatever liquid residue remains within said containers. Though this technology is suitable to many diverse applications, one of its primary functions is the separation of the recyclable plastic contained in a motor oil container from the remaining re-usable motor oil within said container after the container has ostensibly been emptied. It is an objective to accomplish this in an economically advantageous manner which uses neither a solvent nor a wash process, and which reclaims the oil in a suitable form for reprocessing.

In its preferred embodiment, the present invention may be utilized in at least two primary applications. As a compact, free-standing unit, said invention may be used as a size reduction and reclaiming device at the location where the container is used. Such would be the case in automotive service stations, retail outlets, and the like where the end-user of motor oil products is required to properly dispose of the empty containers in an environmentally prudent manner. In a second application, production units may be used in plastic reclaiming plants where large quantities of a given plastic container are being centrally processed. (Chipping or shredding of the container may take place in a location distant from the centrifugal unit in this latter application.) In this case, not only does the device keep the separated liquid from the waste water treatment stream, it separates it while it is still in a salable form to oil recovery processing plants.

This invention operates as a batch process apparatus. In the preferred embodiment, a source of container chips or shreds from an appropriate cutter head is fed into the stationary or partially revolving rotating sieve. During the interval wherein the rotating sieve is being loaded, and subsequently during the duration of the centrifugal process, a discharge door which is located on the bottom of said rotating sieve is in the closed position. Thus, the rotating sieve can be driven at high enough angular rotation speed so that the residual liquid waste contaminant is thrown from the material and through the sieve screening.

By means of an appropriately designed slinger arrangement on the rotating sieve, working in unison with the configuration of the liquid waste containment housing, the residual liquid waste material (notably motor oil) is slung against the inside wall of said containment housing and filtered and pumped into a collection vessel. Air blast means are provided for tumbling (re-orienting) the chips or shreds during the process which will expose all surfaces of said chips or shreds to the centrifugal action.

In yet another application, a solvent may be injected into the rotating sieve during high speed operation. In so doing, the contaminant is removed from the chip or shred material at a high concentration level. In this manner, the centrifugal process of this invention alleviates the need of reclaiming the soluble and solid materials from large volumes of waste water such as are encountered with a typical wash process. Plastic detergent bottles and the like are examples of plastic container materials which are encountered in this latter process. Initial removal of residual soap is done centrifugally to remove the soap in high concentration levels prior to subsequent washing processes which put the remainder of the soap into the waste water stream at a low level of concentration.

At the termination point of the separation process, the rotating sieve is slowed or stopped and the discharge door is opened. The liquid-free material (notably plastic container chips or shreds) are then emptied into the receiver vessel for subsequent reclamation processing.

DESCRIPTION OF THE PREFERRED EMBODIMENTS

Figure 1:
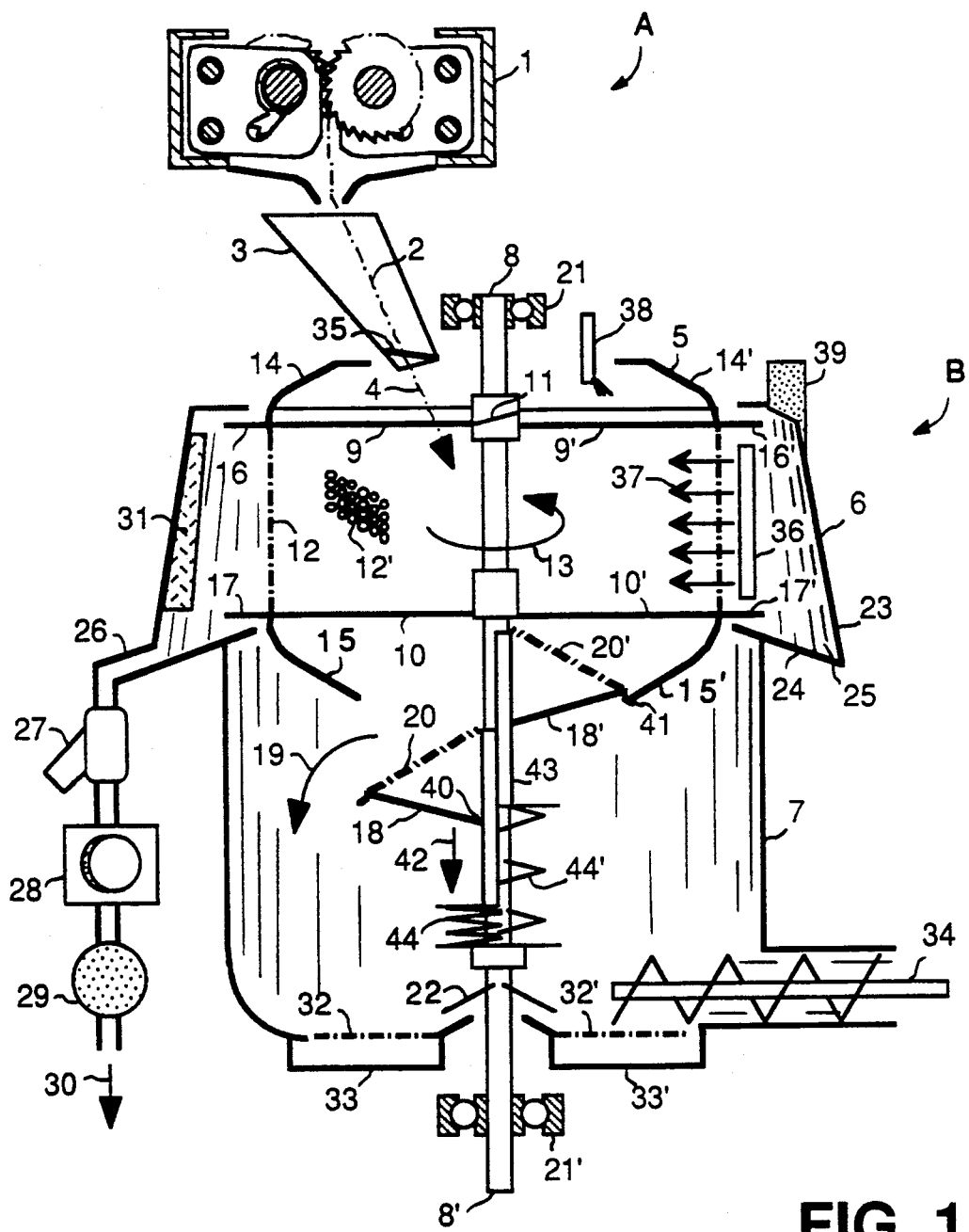
FIG. 1 is a sectional view of the centrifuge and cutter head.

To simplify the description, symmetrical parts, or portions of a single part where divided by a sectional view, will be designated with a prime('). The description of the part(s) having primed reference characters will be limited to a minimum.

Referring now to FIG. 1, the concept of the preferred embodiment is shown in a sectional assembly view. The entire apparatus A is comprised of two sub-assemblies. At the top of the unit a shredding or granulating sub-assembly is provided such as illustrated by the cutter head 1. (This is the assembly described in the application entitled CUTTER ENHANCEMENT FOR PLASTIC SIZE REDUCTION EQUIPMENT, Ser. No. 07/595,258, and the application entitled SECONDARY CUTTER APPARATUS FOR PLASTIC SIZE REDUCTION EQUIPMENT, Ser. No. 07/667677.) Oil, or other liquid contaminated containers are fed into the cutter head 1 for reduction into chips or shreds as indicated by 2. Said chips or shreds 2 are conveyed by means of a guide chute 3 to the chute discharge 4 and into the centrifugal separation sub-assembly.

The centrifugal separation sub-assembly B comprises components including a rotating sieve 5 where the residual liquid waste component is separated from the container chips or shreds 2, a liquid waste containment housing 6 where the residual liquid waste is entrapped, and the chip receiver vessel 7 where the liquid-free chip or shred material is collected.

The rotating sieve 5 assembly consists of a central shaft 8 to which a top 9 and bottom 10 sieve support structure is attached. The top sieve support 9 is formed with an airfoil as shown at 11 which carries the material from the chute discharge 4 into the rotating sieve screen 12 area 12'. The direction of rotation of the rotating sieve 5 as indicated by arrow 13 is established such that the airfoil 11 of the top sieve support 9 forces the material in this said downward direction. Said top and bottom sieve support structures are affixed at their outer periphery to a top 14 and bottom 15 sieve bell which is in each case formed of an impervious metal sheet. An annular top 16 and bottom 17 slinger ring directs the flow of the residual liquid waste into the liquid waste containment housing 6.

The rotating sieve 5 assembly further consists of a discharge door 18 which, in the closed position (shown as 18') seals against the open area of the bottom sieve bell 15 providing a closed container in which the process material is held. In the opened position (as indicated by 18) said discharge door is sufficiently withdrawn from the bottom sieve bell 15 that material may be emptied from the stationary rotating sieve 5 as indicated by arrow 19. Said discharge door is provided with a sieve baffle 20 which directs the material away from the discharge door 18 for complete emptying of the processed chip or shred material.

Finally, the rotating sieve 5 assembly is positioned within the apparatus by means of anti-friction bearings 21 mounted between the shaft 8 and the main support structure (not shown) of the unit. A shaft slinger 22 prevents chip or shred material from passing the point of shaft 8 entrance into the receiver vessel 7.

The liquid waste containment housing 6 consists of a circumferential enclosure surrounding the rotating sieve 5, with the rotating sieve slinger rings (16 and 17) contained within said containment housing. In the preferred embodiment, the containment housing 6 has an outer wall 23 which intersects with a containment housing bottom 24 forming an acute angle collection area 25 wherein the residual liquid waste accumulates. At some point on the periphery of the containment housing 6, said collection area 25 is tapped with a drain pipe 26. In the preferred embodiment, the residual liquid waste (such as motor oil) is directed from the drain pipe 26 through a wye strainer 27 into a motor driven fluid pump 28 and subsequently pumped through a fine filtration media filter 29 (generally of the spin-on cartridge type) and out the discharge pipe as indicated at 30 to a holding vessel which is not shown.

The containment housing 6 may further incorporate a series of radially mounted vertical baffles 31 which cause the liquid thrown from the rotating sieve 5 to flow downward by gravity to the collection area 25 at the base of said containment housing.

The receiver vessel 7 sub-assembly is essentially a receiving vessel for the chipped or shredded material as well as being the structural member for the completed assembly. A screen floor 32 with a drain pan 33 is provided on the bottom of said receiver vessel to trap any residual liquid waste which might inadvertently enter the chip or shred receiving area. Some discharge means (which is not shown) would normally be provided from the drain pan 33 to the drain pipe 26 so that residual liquid waste in this area could also be filtered and salvaged.

In some embodiments, an auger 34 discharge is provided integrally within the receiver vessel 7 to convey cleaned shred or chip material to either a bagging device or to a subsequent part of an in-plant process.

OPERATION

In all embodiments, some means of delivering chips or shreds 2 to the guide chute 3 is achieved. In an embodiment for use in such locations as an automotive service station and the like, the chips or shreds 2 would be generated within the same assembly from a cutter head 1. (In an industrial setting, the chips or shreds may be generated remotely from the centrifuge unit and conveyed to it for processing.) For ease of description in the following embodiments, unless specifically required to identify otherwise, the source of chips or shreds 2 will be described as coming from a cutter head 1 which is integral to the assembly.

Chips or shreds 2 contaminated with a residual liquid waste material (notably motor oil) are delivered into the guide chute 3, and are thereafter discharged into the rotating sieve 5 as indicated at 4. However, because this apparatus functions as a batch process, the discharge from the cutter head 1 will be interrupted when the rotating sieve 5 is processing. Because further liquid contamination of the batch would ensue, a guide chute shutter 35 is used to prevent contamination of the batch. (This same guide chute shutter 35 allows the cutter 1 to discharge material before coming to a complete rest.)

Material delivery of chips or shreds 2 into the rotating sieve 5 may be done with said rotating sieve either stationary or in motion. It is the purpose of the airfoil 11 on the top sieve support 9 to guide the chips or shreds 2 into said rotating sieve while it is in motion. The air movement created by the airfoil 11 in cooperation with the natural air flow through the sieve screen 12 also moves the material into a process position as well as aids in carrying the residual liquid waste from the chips or shreds 2 into the liquid waste containment housing 6.

During the centrifugal process, it may be necessary to tumble the chips or shreds 2 so that they re-orient, allowing the residual liquid waste to be stripped from all surfaces of said chips or shreds. An air blast bar 36 is provided which periodically reverse-pulses air into the screen as indicated by the arrows 37. Said air blast will continue at intervals throughout the process as required to achieve chips or shreds 2 free of residual liquid waste contamination. In some cases, said air blast may coincide with a deceleration of the rotation speed of the rotating sieve 5 to allow greater tumbling action of the chips or shreds 2.

The top 16 and bottom 17 slinger rings, which are immediately adjacent to the upper and lower extremities of the rotating sieve screen 12, guide the residual liquid waste into the liquid waste containment housing 6 and its baffles 31, preventing said liquid from being thrown out of the area adjacent to the guide chute 3 or inadvertently contaminating the material in the receiver vessel 7.

In an embodiment of the apparatus of this invention which is more typically used in plant processing, a solvent spray may be used to wash the residual liquid waste contaminant from the chips or shreds 2 during the centrifugal process. In this embodiment, a spray head 38 is so mounted that the solvent may be directed against the inside of the load.

The advantage of a solvent spray during the process is realized in the removal of the soluble liquid contaminant at high concentration levels. This alleviates a low concentration contamination of subsequent wash cycle solvents (typically water) which must be treated in large volume to remove said contaminant. This is evident with such waste materials as soap (as will be found when reprocessing soap and detergent bottles) and the like, wherein a concentrated soap solution can be removed with the spraying action.

As a further refinement of said spraying process, the drain pipe 26 may be diverted for multiple stage rinsing. That is, a first light rinse may be used to remove a high concentration of waste material, which would be processed in its concentrated form. Subsequent rinses may consist of heavy usage of the rinse solvent (most likely water) being diverted to the main waste water stream. As a further aid to increasing the concentration of the first rinse, the solvent may be recirculated from the drain pipe 26 back into the spray head 38 for a predetermined period of time.

Within the liquid waste containment housing 6 are a series of vertical baffles 31 radially located around the interior periphery of said housing. The baffles 31 reduce the swirl of the air/oil (or other residual liquid waste) entrainment and thus aid the dispersion of said liquid to the collection area 25 of the containment housing 6. To further augment the dissipation of the air velocity within the containment housing 6 an air exhaust stack 39 is provided which allows the escape of the air moving at high velocity and separates the residual liquid waste allowing it to return to the collection area 25.

The discharge door 18 consists of multiple elements. The discharge door 18 proper consists of an impervious material so that residual liquid waste cannot enter the receiver vessel 7. However, said door is so mounted that the portion closest to the shaft forms a catch basin 40 (by forming an acute angle between the plane of the shaft 8 and the discharge door 18) for residual liquid waste which will drain into it through the sieve baffle 20 when the rotating sieve 5 is stationary. Inasmuch as a leak-free seal area 41 is provided between the closed discharge door 18 and the bottom sieve bell 15, residual liquid waste which has drained into the catch basin 40 will be carried up the slope of the discharge door 18, through the sieve baffle 20, over the seal area 41, across the bottom sieve bell 15, and through the sieve screen 12 for eventual discharge during the centrifugal process.

The function of the sieve baffle 20 becomes evident, however, when the discharge door is opened as indicated by arrow 42. For the material to properly discharge from the stationary rotating sieve 5 as indicated by arrow 19, it is necessary for it to pass over an obtuse angle (as formed by the sieve baffle 20 in relationship to the shaft 8).

The discharge door 18 has a central hollow mounting tube 43 which moves vertically on the shaft 8. It further has a spring loaded compressive means 44 which forces said door assembly shut against the seal area 41. Not shown, but indicated by the arrow 42 is an opening mechanism for the discharge sequence.

Pertinent functions of the receiver vessel 7 and the auger 34 have already been described in a previous section.

Of necessity, this apparatus will include a drive means consisting of an electric motor or other motive device which is not shown. Said motor drive would be coupled to the shaft 8 at an appropriate location. In addition, control and timing devices are also incorporated into the design of this apparatus which are outside of the concern of these particular specifications.

While the present invention has been described in conjunction with a single centrifugal embodiment, (though comprising two diverse applications) it is to be understood that various modifications and other embodiments of the present invention may be made without departing from the scope of the invention as described herein and as claimed in the appended claims.

The embodiments of the invention in which an exclusive property or privilege is claimed are defined below.

What I claim is:

1. A rotating sieve assembly for use in a centrifugal apparatus for separating container material from a residual liquid waste, said sieve assembly comprising:
    a cylindrical sieve screen mounted on a central shaft;
    said sieve screen including an imperforate sieve bell at one end thereof extending convexly relative to the interior of said sieve screen, said sieve bell defining a discharge opening;
    a discharge door for covering said discharge opening, said discharge door including a liquid impervious outer covering having an outer peripheral edge contiguous to the sieve bell when the discharge door is in a closed sealing position which prevents residual liquid waste from escaping from the rotating sieve assembly, said impervious outer covering forming an acute angle with the shaft relative to the interior of said sieve screen thereby forming a catch basin for trapping residual liquid waste in the catch basin when the rotating sieve assembly is stationary, and for providing a plane of unrestricted travel of the residual liquid waste toward the sieve screen during high speed rotation,
    said discharge door including a sieve baffle which forms an obtuse angle with the shaft relative to the interior of said sieve screen to provide a sloping surface which aids in the discharge of the container material past the discharge door, the sieve baffle having a sieve extending from the shaft to the outer peripheral edge of said impervious outer covering through which the residual liquid waste may pass into said catch basin; and,
    actuating means for the discharge door, which allows said discharge door to shift between said closed sealing position against the sieve bell of said rotating sieve assembly, and an open discharge position which allows said container material to flow out of said discharge opening.

2. A centrifuge for separating chipped material from residual liquid waste contained in the vessel, comprising:
    a rotating sieve assembly including a central driven shaft and a cylindrical sieve screen carried thereon;
    means for rotating said central driven shaft, whereby the chipped material is rotated at high speed within said sieve screen for removing the residual liquid waste from the chipped material and wherein the residual liquid waste exits said sieve assembly through said sieve screen;
    said sieve assembly having a first impervious sieve bell attached at a first end of said sieve screen for loading chipped material, a second impervious sieve bell attached at a second end of said sieve screen defining a discharge opening, said first and second impervious sieve bells extending convexly relative to the interior of said sieve screen;
    a discharge door for covering said discharge opening, said discharge door including a fluid impervious outer covering having an outer peripheral edge contiguous to the second sieve bell when said discharge door is in a closed sealing position, said impervious outer covering meeting said shaft at an acute angle relative to the interior of said sieve screen thereby forming a catch basin for retaining the residual liquid waste in said sieve assembly when said assembly is in a non-rotating condition, and for providing a plane of unrestricted travel for the residual liquid waste from said catch basin to said sieve screen during rotation of said assembly,
    said discharge door further including a fluid pervious sieve baffle which forms an obtuse angle with the shaft relative to the interior of said sieve screen providing a sloping surface for directing the chipped material past the discharge door when said door is opened and for providing a sieve through which residual liquid waste may pass into said catch basin, said sieve baffle extending from the shaft to the outer peripheral edge of said impervious outer covering; and, actuating means for said discharge door which provides shifting of said door between said closed, sealing position against the second sieve bell of said sieve assembly, and an open discharge position, wherein the chipped material may be discharge from said sieve assembly.

3. The centrifuge of claim 2 which includes a containment housing encompassing said rotating sieve assembly, and wherein the first and second sieve bells each included a slinger ring attached to and surrounding an outer surface thereof and extending radially outwardly relative to said shaft for directing the residual liquid waste into said containment housing.

4. The centrifuge of claim 2 further including an airfoil configured support member for said rotating sieve which directs said chipped material into said rotating sieve.

5. The centrifuge of claim 2 further including a liquid waste containment housing wherein the residual liquid waste is collected subsequently to its passage through said sieve screen.

6. The centrifuge of claim 5 further including vertical baffles circumferentially located within said liquid waste containment housing which impede circular flow of the residual liquid which is airborne, and which causes said airborne liquid to fall to the collection area of said waste containment housing.

7. The centrifuge of claim 5 further including an air blast bar for re-orienting said chipped material whereupon complete centrifugal removal of the residual liquid waste is achieved.

8. The centrifuge of claim 5 further including a drainage and pumping means for conveying the residual liquid waste from said liquid waste containment housing having a filter element operating in unison with a pumping means.

9. The centrifuge of claim 2 further including a spray head through which a solvent rinse material may be injected into said rotating sieve assembly during processing.

10. The centrifuge of claim 2 further including a receiver vessel wherein said chipped material is received upon completion of processing.

11. The centrifuge of claim 10 further including a drain pan having a screen thereover wherein excess residual liquid waste is isolated from said chipped material.

12. The centrifuge of claim 10 further including an auger conveying means for clearing said receiver vessel of said chipped material.

13. The centrifuge of claim 2 further including an assembly which contains chipping means and the centrifuge therein.

* * * * *